US008399039B2

(12) United States Patent
Sher et al.

(10) Patent No.: US 8,399,039 B2
(45) Date of Patent: Mar. 19, 2013

(54) SHELF STABLE LIQUID WHITENER AND PROCESS OF MAKING THEREOF

(75) Inventors: Alexander A. Sher, Dubin, OH (US); Winnie Octavia, Delaware, OH (US); Leticia Maria Michel, Ittigen (CH); James Tuot, West Palm Beach, FL (US)

(73) Assignee: Nestec S.A., Vevey (CH)

( * ) Notice: Subject to any disclaimer, the term of this patent is extended or adjusted under 35 U.S.C. 154(b) by 189 days.

(21) Appl. No.: 12/745,388

(22) PCT Filed: Nov. 26, 2008

(86) PCT No.: PCT/EP2008/066184
§ 371 (c)(1),
(2), (4) Date: May 28, 2010

(87) PCT Pub. No.: WO2009/068543
PCT Pub. Date: Jun. 4, 2009

(65) Prior Publication Data
US 2010/0323078 A1    Dec. 23, 2010

Related U.S. Application Data

(63) Continuation-in-part of application No. 11/947,490, filed on Nov. 29, 2007, now abandoned.

(51) Int. Cl.
*A23L 2/58* (2006.01)

(52) U.S. Cl. ......... 426/575; 426/573; 426/590; 426/250

(58) Field of Classification Search .................. 426/575, 426/573, 262, 250, 590, 588
See application file for complete search history.

(56) References Cited

U.S. PATENT DOCUMENTS

| | | | | |
|---|---|---|---|---|
| 3,579,356 A * | 5/1971 | Miller | ............................ | 426/540 |
| 3,935,325 A | 1/1976 | Gilmore et al. | | |
| 4,748,028 A * | 5/1988 | McKenna et al. | ............. | 426/130 |
| 4,784,865 A | 11/1988 | Baker et al. | | |
| 4,834,990 A | 5/1989 | Amer | | |
| 4,857,341 A | 8/1989 | Tran et al. | | |
| 4,980,193 A * | 12/1990 | Tuason et al. | ................. | 426/654 |
| 5,009,912 A | 4/1991 | Nixon | | |
| 5,024,849 A | 6/1991 | Rasilewicz | | |
| 5,108,773 A * | 4/1992 | Smith et al. | ................... | 426/582 |
| 5,209,942 A * | 5/1993 | Bauer et al. | ................... | 426/573 |
| 5,260,084 A | 11/1993 | Nixon | | |
| 5,284,674 A | 2/1994 | Fazio | | |
| 5,290,582 A * | 3/1994 | Dressel et al. | ................. | 426/584 |
| 5,480,670 A * | 1/1996 | Pordy | ............................ | 426/580 |
| 5,571,334 A | 11/1996 | Dunn et al. | | |
| 5,700,513 A * | 12/1997 | Mulchandani et al. | ........ | 426/590 |
| 6,025,007 A * | 2/2000 | Krawczyk | ....................... | 426/573 |
| 6,391,368 B1 | 5/2002 | Tuason et al. | | |
| 6,468,576 B1 * | 10/2002 | Sher et al. | ...................... | 426/565 |
| 6,479,649 B1 * | 11/2002 | Tsai et al. | .................... | 536/1.11 |
| 6,673,384 B1 | 1/2004 | Villagran et al. | | |
| 6,824,810 B2 * | 11/2004 | Sargent et al. | ................. | 426/588 |
| 2005/0276898 A1 | 12/2005 | Pascual et al. | | |
| 2006/0280701 A1 | 12/2006 | Lynch | | |

FOREIGN PATENT DOCUMENTS

| | | |
|---|---|---|
| GB | 1430639 | 3/1976 |
| GB | 1517912 | 7/1978 |
| JP | 52144646 | 12/1977 |
| JP | 6087775 | 11/1994 |
| JP | 2004254594 | 9/2004 |
| WO | WO9325083 | 12/1993 |
| WO | WO9424887 | 11/1994 |
| WO | WO 97/25878 * | 7/1997 |
| WO | WO9725878 | 7/1997 |
| WO | WO03079821 | 10/2003 |
| WO | WO2004071215 | 8/2004 |
| WO | WO2005086795 | 9/2005 |
| WO | WO2006036059 | 4/2006 |
| WO | WO2007044782 | 4/2007 |

OTHER PUBLICATIONS

Avicel RC-591. FMC. 1997. [Online]. Downloaded from: <URL: http://usuarios.advance.com.ar/43437141/Brochure%20of%20Avicel%20RC-591.pdf>.*
Imeson, A.P. Ch. 5: Carrageenan. 2000. In Handbook of hydrocolloids. CRC Press. Boca Raton, FL. p. 87-102.*

* cited by examiner

*Primary Examiner* — Carolyn Paden
(74) *Attorney, Agent, or Firm* — K&L Gates LLP

(57) ABSTRACT

A shelf-stable, liquid whitening composition having a whitening agent and a stabilizing system are disclosed. The stabilizing system includes a gum component, preferably of a mixture of two different gum, present in an amount sufficient to suspend the whitening agent in the liquid whitening composition and in an aqueous media to which the liquid whitening composition is added, an emulsifier in an amount sufficient to maintain emulsion stability in the liquid whitening composition and in the aqueous media, and a cellulose component, preferably of a blend of a microcrystalline cellulose and carboxymethylcellulose blend, in an amount sufficient to help maintain suspension and emulsion stability of the liquid whitening composition alone and in the aqueous media. The stabilizing system maintains the liquid whitener in a homogeneous state for at least about 9 months at ambient temperatures, and further maintains the whitening composition in suspension when added to the aqueous media.

20 Claims, No Drawings

SHELF STABLE LIQUID WHITENER AND PROCESS OF MAKING THEREOF

CROSS-REFERENCE TO RELATED APPLICATIONS

This application is a 371 of PCT/EP2008/066184, filed Nov. 26, 2008, which is a continuation-in-part of 11/947,490, filed Nov. 29, 2007, now abandoned.

FIELD OF INVENTION

The present invention relates to a liquid whitening composition for use in foodstuffs. More particularly, the embodiments of the invention relate to an aseptically packaged, shelf-stable, non-dairy, liquid coffee whitener, and the process of making same.

BACKGROUND OF THE INVENTION

Coffee whiteners can be in liquid or powder forms. Powdered forms tend to be less able to simulate the qualities of traditional dairy creamers, such as color, body and texture, and often fail to achieve complete dissolution.

Liquid whiteners are used widely in homes, offices, restaurants, workplaces, and other establishments to whiten and flavor beverages such as coffee and tea, and the market for non-dairy creamers that provide a whitening quality is rapidly growing. The United States is the market leader for this type of product.

Unfortunately, liquid dairy creamers tend to deteriorate rapidly, even when stored at refrigeration temperatures. One possible solution is to use a non-dairy whitener, but this introduces new challenges of creating a product that mimics the feeling of dairy, while offering the desired stability. Specific stability concerns include the ability to maintain a homogeneous product without separation or sedimentation of components during storage at room temperature and elevated temperatures for several months.

Current consumer trends demonstrate increased consumption of reduced-fat and fat-free products, including dairy products such as creamers. Fat present in creamers typically takes the form of trans-fatty acids, which, in accordance with health guidelines, consumers are reducing or eliminating consumption. However, fat provides a whitening quality, and the removal thereof requires an increase in whitening capability of the creamer. This can be achieved by the addition or more of a whitening component, but it is difficult to maintain the whitening component in suspension. Therefore, it is difficult to provide full-fat, low-fat and fat-free whiteners, without diminishing their whitening capacity as compared to conventional products, and further without compromising stability. Fat also provides flavor and body, so it is a further challenge to prepare a fat-free or reduced-fat whitener that maintains the same satisfaction as a full-fat product.

A desired whitener should be stable physically during storage and retain a constant viscosity over time. When added to coffee or similar beverages, the product should provide a good whitening capacity, dissolve rapidly and remain stable in a hot acidic environment with no feathering and/or sedimentation.

U.S. Pat. No. 3,935,325 describes a freeze-thaw stable coffee whitener. The disclosed coffee whitener is made with water, vegetable fat, vegetable protein, carbohydrates, buffering salt, emulsifiers and other ingredients. Such whiteners are inconvenient due to the need to thaw the product prior to use, and are high in cost due to handling and storage requirements.

European Patent Application No. 0 457 002 describes a liquid coffee whitener composed of fat or oil, water, carbohydrate and an amount of a protein hydrolysate effective to provide a stable emulsion. However, this coffee whitener is not shelf-stable.

U.S. Pat. No. 4,748,028 discloses an aseptic fluid coffee whitener and process for preparing the same. The process includes ultra-high temperature (UHT) sterilization of a mixture of water, vegetable fat, emulsifiers, a milk protein, salt and other ingredients, cooling, homogenizing and cooling the mixture, and filling the resulting liquid in an aseptic container under aseptic conditions. The main disadvantage of the coffee whiteners disclosed by the patent is the high level of fat in the creamer, and the insufficient whitening power of the reduced-fat version of the creamer.

Thus, there is a need for a liquid shelf-stable whitener, especially full-fat, fat-free and low-fat, which has a high whitening capacity, good physical and chemical stability throughout the duration of its shelf-life, without creaming, sedimentation, or altered flavor. The whitener must also have suitable viscosity and pleasant mouth-feel, without feathering and fat separation when added to coffee.

The present invention provides a whitener having the qualities set forth above, and therefore satisfies a need in the art.

SUMMARY OF THE INVENTION

The present invention relates to a shelf-stable, liquid whitening composition (also referred to herein as a beverage whitener) that includes a whitening agent and a stabilizing system to maintain the liquid whitening composition in a homogenous state in the composition for at least about 9 months at ambient temperatures. The stabilizing system includes a gum component, preferably of a mixture of two different gums, present in an amount sufficient to suspend the whitening agent in the liquid whitening composition, an emulsifying component in an amount sufficient to provide a stabilized emulsion of the whitening composition, and a cellulose component, preferably a blend of two different cellulose compounds, and more preferably a blend of microcrystalline cellulose (MCC) and carboxymethylcellulose (CMC), present in an amount sufficient to stabilize the whitening agent in suspension. The gum component, emulsifying component, and cellulose component also help provide and maintain emulsion stability and other desired properties of the liquid whitening composition in an aqueous media to which the liquid whitening composition is added.

In one embodiment of the invention, the whitening agent is titanium dioxide. Titanium dioxide can be present in an amount of about 0.05 to about 1 percent by weight of the composition, and can have a particle size of about 0.1 to about 0.7 microns.

It was surprisingly found that addition of a combination of MCC and CMC resulted in significant improvement of titanium dioxide suspension stability. In one embodiment, the MCC/CMC blend has a weight ratio of MCC to CMC of about 3:1 to about 30:1. This gum component is present in an amount of about 0.1 to about 1 percent by weight of the composition.

Advantageously and unexpectedly, the MCC and CMC system provides additional improved enhancements and functionality in certain combinations with the gum component. While combinations of different gum components may be used, it is preferred to use a mixture of kappa and iota carrageenan. The combination of kappa- and iota-carrageenan of the gum component in the disclosed concentrations and ratios along with the combination of MCC and CMC in the disclosed concentrations and ratios resulted in the best stability of the titanium dioxide suspension. Mixtures of kappa, lambda and iota-carrageenan may also be used. In comparison, if only carrageenans or their combinations were added to the whitener to achieve the desired product viscosity, no improvement in suspension stability was observed. Further, if only one type of carrageenan, kappa or iota, was added to the whitener with to obtain the desired product viscosity, no improvement in suspension stability was observed. Thus, the invention requires the combination of two different gums in the gum component and two different cellulose compounds in the cellulose component for best performance.

Accordingly, the gum component is preferably a combination of a kappa and iota carageenan gum, present in an amount of about 0.005 to about 0.2 percent by weight of the total whitening composition. A suitable weight-to-weight ratio of kappa to iota carageenan is about 10:1 to about 1:15.

Surprisingly, it was discovered that sodium caseinate provides good emulsion stability of the aseptic liquid coffee whiteners including $TiO_2$ when used in combination with the preferred stabilizing systems disclosed herein. It was also unpredictably found that the above described emulsion stabilizing system is optimum when used in combination with the preferred MCC/CMC/kappa and iota carrageenan system. Thus, a preferred embodiment of the invention includes an emulsifying component of sodium caseinate in combination with a low molecular weight emulsifier, with sodium caseinate present in an amount of about 0.1 to about 1.8 percent by weight of the composition and the low molecular weight emulsifier present in an amount of about 0.1 to about 1.0 percent by weight of the composition.

It was further surprisingly found that the use of the defined combinations of titanium dioxide, MCC and CMC, kappa- and iota-carrageenan, sodium caseinate and low molecular weight emulsifiers did not cause physico-chemical instability of UHT treated and aseptically filled liquid coffee whiteners, and did not affect the whitener viscosity during nine month storage at room temperature. The most stable liquid coffee whitener (no creaming, phase separation, sedimentation and viscosity changes during nine month storage at room temperature) was made using the unique stabilizing system comprising $TiO_2$, a combination of CMC and MCC, kappa- and iota-carrageenan, sodium caseinate and a combination of monoglycerides and esters of monoglycerides.

Therefore, in a particularly preferred embodiment, the emulsifying component is sodium caseinate and a combination of a monoglyceride and an acid ester of the monoglyceride, with sodium caseinate present in an amount of about 0.15 to about 0.3 percent by weight of the composition, and the combination of monoglyceride and acid ester of the monoglyceride is present in an amount of about 0.2 to about 0.6 percent by weight of the composition. The liquid whitening composition can further include a vegetable oil in an amount of about 0.5 to about 15 percent by weight of the composition, and/or sweetener in an amount of about 0.1 to about 50 percent by weight of the composition. In a preferred embodiment, the liquid whitening composition is low-fat or non-fat. Suitable compositions can have a total solid content between about 10 to about 65 percent by weight of the total composition. The stabilizing system can further include a pH buffer. The whiteners can also include added colors and/or flavors.

The invention further relates to a beverage made of water, a beverage-forming component and a sufficient amount of the whitening composition set forth herein to provide whitening to the beverage. The beverage forming component can be coffee, tea, chocolate or a fruit drink.

Embodiments of the invention are also directed to a process of preparing a shelf-stable liquid coffee whitener. The process includes providing a powdered form of the whitening agent and stabilizing system components of the whitening composition set forth herein, dissolving the powdered whitening agent and stabilizing components in hot (70 to 95 C) water under agitation, adding a melted fat to the hot water to produce a mixture, sterilizing the mixture using ultra-high temperature (UHT) treatment, homogenizing the mixture, and cooling the mixture under aseptic conditions. Homogenization can be performed before or after UHT treatment, as desired.

Though the present invention discloses the coffee whiteners, use is not limited to coffee applications. For example, the whiteners can be also used for whitening of other beverages, such as tea or cocoa, or used with cereals, as cream for berries, creamers for soups, in many cooking applications, etc.

DETAILED DESCRIPTION OF THE PREFERRED EMBODIMENTS

The present invention is directed to a shelf-stable liquid whitening composition (also referred to herein as a whitener or a creamer), formed by the interaction of a whitening component, oil/fats, proteins, carbohydrates and stabilized by the use of complex systems (also referred to herein as a stabilizing system) including combinations of gums and celluloses, an emulsifying system, and optional, a pH buffer.

The whitener includes a whitening component or agent such as an oxide that is suitable for human consumption in the provided amount. In preferred embodiments of the invention, the whitening agent is titanium oxide, present in an amount of about 0.1 to about 1 percent, and more preferably about 0.25 to about 0.65 percent by weight of the composition.

The aqueous media to which the whitener is added can be a beverage such as coffee, tea, a chocolate or cocoa-based drink, or a fruit-based drink. The beverage can be hot or cold, and can include natural and/or artificial flavors.

A stabilizing system is used to stabilize or maintain the whitener in a homogeneous state, such that there is no separation of components, sedimentation, creaming, feathering, gelation, or changes in viscosity. The stabilizing system maintains the whitener in a homogenous state in the composition at ambient temperatures for at least nine months. This enables the composition to be shelf stable during transport and storage prior to use. Ambient temperatures are typically room temperature and above, but include any environmental temperature at which the whitener is stored. The stabilizing system further helps maintain the whitener in the aqueous media to which the whitener added, such that the whitener exhibits the desired whitening and suspension qualities, and imparts the desired texture to achieve a palatable "mouthfeel".

The stabilizing system includes a gum component to help maintain the whitening agent in suspension, and also to help to maintain the whitener in an aqueous media or beverage to which the whitener is added. The gum component can be a combination of different gums selected from carrageenan gums, such as kappa, lambda or iota carrageenan. In a preferred embodiment the gum component is the combination of two different carrageenans in an amount from about 0.005 percent to about 0.2 percent by weight of the total composition of whitener. For instance, the gum component comprises kappa- and lambda-carrageenan, or kappa- and iota-carrageenan, or lambda- and iota-carrageenan, or kappa-, lambda- and iota-carrageenan. In a further preferred embodiment, the gum component is a combination of a kappa and iota carrageenan, with the kappa carrageenan being present in an amount of about 0.005 to about 0.05%, and the ratio of kappa to iota carrageenan is about 1:2 to about 1:6, in a weight ratio. Suitable examples include those sold under the trade name Seakem or Viscarin, available from FMC Corporation of Philadelphia, Pa.; Grinsted available from Danisco A/S of Denmark.

An emulsifier is present in the stabilizing system to maintain emulsion stability of the liquid whitener, and also to maintain the required whitener properties throughout aqueous media to which the whitener is added. The amount of emulsifier can range about 0.1 to about 3 weight percent of the total composition of whitener. The emulsifier can be a protein-based emulsifier, a low molecular weight emulsifier, or a combination. Suitable protein-based emulsifiers include, but are not limited to, casein, sodium caseinate, soy protein, whey protein, or a combination thereof. In a preferred embodiment of the invention, the protein-based emulsifier is sodium caseinate, present in an amount of about 0.1 to about 1.2 percent weight of the total composition.

Low molecular weight emulsifiers may include, but are not limited to, monoglycerides, diglycerides, acid esters of monoglycerides, sodium or calcium stearoyl lactylate, lecithin and enzyme modified lecithin, stearyl citrate, fatty acids and their salts, or diacetyl esters of monoglycerides, alone or in combination. The emulsifiers used are not limited to those of a single acyl or fatty acid component, such as on a specific carbon chain length or degree of unsaturation. In a preferred embodiment, the low-molecular weight emulsifier is a monoglyceride or an acid ester of a monoglyceride. In a particularly preferred embodiment, the low molecular weight emulsifier is a combination of one or more monoglycerides and acid esters of thereof. Suitable examples include those sold under the trade name Dimodan or Panodan, available from Danisco Ingredients USA, Inc. of New Century, Kans., USA; Myverol or Admul available from Kerry Bio-Science Inc.

Low molecular weight emulsifiers can be present in an amount of about 0.1 to about 1.0 percent by weight of the total composition. In one preferred embodiment of the invention, the stabilizing system has about 0.15 to about 0.3 percent by weight of the composition of sodium caseinate and about 0.2 to about 0.6 percent by weight of the composition of monoglycerides and acid esters of monoglycerides. A whitener with these specifications displays superior stability and high whitening capability.

The stabilizing system further includes a cellulose component and gum component to stabilize suspension of the whitening agent and emulsifying component to stabilize provide emulsion stability to the whitening composition, including the cellulose and gum components. The emulsifying system or component also helps stabilize the whitening composition in an aqueous media to which the whitener is added.

The cellulose component is a blend of two different cellulose compounds. In a preferred embodiment of the invention the cellulose component includes a blend of microcrystalline cellulose (MCC) and carboxymethylcellulose (CMC), and is present in an amount of about 0.1 to about 1.0 percent by weight of the composition. Co-processed MCC and CMC may also be used. In other preferred embodiments, the MCC/CMC is present in an amount of about 0.2 to 0.6 percent by weight of the composition, and in a particularly preferred embodiment, the MCC/CMC blend is present in an about of about 0.3 to about 0.5 percent by weight of the composition.

The weight to weight ratio of MCC to CMC can vary from about 3:1 to about 30:1, preferably from 8:1 to 12:1, and most preferably from 9:1 to 10:1. A ratio of less than 3:1 can cause a significant increase in $TiO_2$ sedimentation, where a ratio above 30:1 can increase $TiO_2$ sedimentation and co-precipitation of MCC.

It has been unexpectedly discovered that improved functionality is achieved when the stabilizing system includes the MCC/CMC blend, in the preferred ranges and ratios set forth above, in combination includes kappa and iota carrageenan, preferably in an amount of about 0.005 to about 0.1 percent by weight of the composition, and in a weight to weight range of 1:2 to 1:6 of kappa to iota carrageenan. Such combinations resulted in significantly improved stability of titanium dioxide in suspension. Stability is further improved when this MCC/CMC/kappa and iota carrageenan system includes an emulsifying component of sodium caseinate in an amount of about 0.15 to about 0.3 percent by weight of the composition, and a low molecular weight emulsifier in an amount of about 0.2 to about 0.6 percent by weight of the total composition. Superior stability is achieved when the low molecular weight emulsifier is a combination of monoglyceride and an acid ester of the monoglyceride.

MCC/CMC co-processed with carrageenan, such as kappa-, lambda- and iota-carrageenan, may also be used. Suitable examples of co-processed MCC/CMC/carrageenan include those sold under the trade name Avicel, available from FMC Corporation of Philadelphia, Pa.

The whitener can also include a fat such as a vegetable oil in an amount of about 0.5 to about 15% by weight of the composition. The vegetable oil can have partially or wholly hydrogenated oils, alone or combination. Suitable vegetable oils include, but are not limited to, soybean oil, coconut oil, palm oil, cotton seed oil, canola oil, olive oil, sunflower oil, safflower oil, and combinations thereof.

In other embodiments, the whitener includes a sweetener in an amount of about 0.1 to about 50% by weight. The sweetener can be a natural sweetener such as sucrose, or a synthetic sweetener such as sucralose, or a combination thereof. In additional embodiments, the whitener includes a pH buffer. Preferably, the pH range is about 6 to 8 and more preferably about 6.5 to 7.5. Non-limiting examples of suitable buffers are salts such as potassium phosphate, sodium bicarbonate, sodium citrate, and sodium tripolyphosphate. The buffer can be present in an amount of about 0.5 to about 1% of the total weight of the composition.

The liquid whitener can have a total solid content between about 10 to 65%, preferably about 30-50%, and most preferably about 35-45% by weight of the total composition. When combined with an aqueous beverage such as coffee, the resulting liquid can have a solid content of from about 2 to 10%, preferably about 4-8%, and most preferably about 5-6% weight of the total composition.

Embodiments of the invention include fat-free, reduced-fat or low-fat, and full-fat products. Preferred embodiments are directed to full-fat, low-fat and non-fat whiteners, with a stabilizing system that can maintain the whitener in a homogenous state, without substantially compromising the qualities found in Extended Shelf Life (ESL) whiteners. ESL creamers generally keep for two months at refrigeration temperatures.

The liquid whitener, when combined with a beverage such as coffee, produces a beverage with an appealing, light color, good mouth-feel, body, smooth texture, and a pleasant taste with no off-flavors developed during shelf-life/storage. The whitener whitens or lightens liquid beverages by combining the whitener with the beverage at ratio of about 1:3 to 1:10, preferably about 1:5 to 1:7 ratio, and most preferably about 1:6.

Titanium dioxide was used as the whitening component in all exemplary formulations, with a particle size of about 0.4 microns. A particle size range of between 0.1 and 0.7 microns should be suitable depending upon the particular formulation. In a preferred embodiment, the particle size range is of between 0.3 and 0.5 microns. In the case of titanium dioxide, the optimum size of the whitening component is obtained when light scattering is delivering the most intense white color. This is related to the wavelength considered and for the whole visible spectrum the optimum size would be half the average wavelength or around 0.30 microns. It may be expected that a smaller size would make the liquid creamer itself bluish in color, whereas a larger size would progressively decrease the whitening power. Using a particle size around a mean of 0.30 microns should be beneficial at least on two accounts. The increased whitening power results in less of the whitening component needed for the same end color, which allows for a costs reduction. The smaller particles are easier to suspend and keep suspended. Generally speaking suspended particles are governed by the Stokes' law terminal velocity in term of gravitational force providing a tendency for settling. However at particle size lower than about 2.0 microns, other forces become significant and also control the settling or suspension. It is well known that below 2.0 microns Brownian motion predominates and the gravitational forces becomes less and less important as the size is reduced, thus favoring suspension of small particles without much settling (Basic Principles of Particle Size Analysis, Alan Rawle, Malvern Instruments Limited).

Exemplary whitener compositions prepared in accordance with embodiments of the invention were prepared and tested for stability over time. As a reference point, a commercially available, chilled ESL whitener was used. New formulations prepared in accordance with embodiments of the invention were tested against the reference product.

To ensure that the formulations were able to maintain physical stability over time at varying storage conditions, without gelation and fat separation, while maintaining good viscosity, the formulations were tested for whitening ability, visual appeal, pH, sedimentation, and viscosity. Analyses to assess the presence of these qualities included visual observation of the whitener, both before and after shaking (Typically, some sediment is reabsorbed after shaking.) Whitening Capacity was determined using a Colorimeter (Model COLORQUEST™ XE™) to determine Color L, a, and b values of the whitener when added to coffee. A METROHM™ (model 632) was used to measure pH of the whiteners, and viscosity was analyzed by TA AR 1000N™ stress rheometer. The formulations were also observed by microscopy, using an Olympus BX51™ microscope. Finally, a value ranging from 1 to 10 was assigned for overall sensory evaluation.

The whitening capacity of the whitening formulations with all components within the preferred range after 3 weeks of storage at 38° C., after shaking, represented by L (lightness value display high whitening ability). The results also show a marked difference between the reference formulation and new formulations. The similar results of the whitening capacity were found for the formulations after 3 months of storage at 30° C., while the L value of the reference formulation decreased significantly. The whitening ability of the reference formulation was reduced due to the formation of compact sediment that could not be re-suspended in aqueous media, even after shaking The improved whitening ability of the new formulations can be attributed to the ability to maintain titanium dioxide in suspension.

It also was found an improved whitening ability for the new formulations after 6 and 9 months storage at 20° C., reflected by the same amount of $TiO_2$ remaining in the sample. The reference formulation, however, showed a decreased whitening ability over time, due to sedimentation of $TiO_2$. These findings were also confirmed by measurements of L values of the reference and the new samples. It was determined that the new formulations prepared in accordance with embodiments of the present invention demonstrate superior whitening ability after extended storage at ambient temperature, when compared to the reference value.

Viscosity plays a significant role in particle suspension. Increasing product viscosity positively affected $TiO_2$ suspension. However, an increase in liquid viscosity alone is not sufficient to suspend titanium dioxide. While viscosity is an important factor, the formation of a network in the liquid to assist in suspension of particles is crucial. Moreover, viscosity of the whitener has an upper limit.

Thus, for good pouring ability of liquid whitener, viscosity upper limit of 60 cP at temperature of 4° C. was established. Increasing product viscosity by the addition of stabilizers/stabilizing systems should lead to better suspension stability of $TiO_2$; however, it was unexpectedly found that product viscosity is not a main factor governing titanium dioxide suspension. For example, systems containing gellan gum, xanthan gum, guar gum or a combination thereof did not provide desirable $TiO_2$ suspension even at high viscosity (60 cP and higher). Moreover, using these gums with or without kappa or iota carrageenan did not improve $TiO_2$ suspension. Addition of these gums resulted in product gelation and/or phase separation (marbling/streaks) and also did not prevent creaming.

Embodiments of the invention are also directed to a beverage that includes water, a beverage-forming component, and a sufficient amount of the described whitener herein to provide whitening to the beverage. The beverage forming component can be coffee, tea, chocolate or a fruit drink. The beverage forming component can also be a natural or artificial flavoring component, such as powdered crystals or flavored syrup. The beverage itself can be hot, cold, or room temperature and can include natural and/or artificial flavors.

The present invention is further directed to a process of preparing the whiteners set forth herein. The process includes providing a powder form of the whitening agent and stabilizing system components of the whitening composition set forth herein, dissolving the whitening agent and stabilizing system components in hot (75 to 90 C) water under agitation, adding a melted fat to the hot water to produce a mixture, sterilizing the mixture using a conventional ultra-high temperature (UHT) treatment; homogenizing the mixture before and/or after UHT treatment; and cooling the homogenized mixture under aseptic conditions. The method can further include filling aseptic containers under aseptic conditions with the homogenized combination.

As evidenced by the data provided above, formulations prepared in accordance with the present invention provide a shelf-stable liquid whitener that is homogeneous during the ambient storage for several months without phase separation, gelation and sedimentation. This is a significant improvement over existing whiteners, which must be kept at chilled temperatures. By producing a whitener that does not require refrigeration, transportation and storage costs are significantly reduced. The developed whiteners provide high whitening capacity, even at low-fat or fat-free levels, without the decrease in stability over the ambient storage.

The whiteners described herein maintain constant viscosity during storage at ambient temperatures. The whiteners are easily dispersible in coffee and are stable in hot and cold acidic environments without feathering, breaking emulsion or sedimentation. Also, when added to a beverage, the whitener provides a good mouth-feel, body, smooth texture, and also a good flavor with no off-taste developed during storage time.

EXAMPLES

The invention is further defined by reference to the following illustrative, non-limiting examples.

Example 1

3.5 kg of sucrose was mixed together with 33 g of kappa-carrageenan, 198 g of iota- carrageenan, and 1.98 kg of 10:1 MCC/CMC blend. The dry blend was added into 219 kg of hot water (65-70° C.) under high agitation. 1.49 kg of disodium phosphate was added to the tank under continuous agitation.

3.5 kg of sucrose, 1.0 kg of titanium dioxide, 1.0 kg of sodium Caseinate, 20 g of colorant, and 1.0 kg of flavor were blended together. The dry blend was added to the tank of hot water with above stabilizers under agitation. After 5-10 minutes of mixing, 330 g of Dimodan and 1.0 kg of Panodan were added under continuous agitation. 8.0 kg of oil (melted at 55-60° C.) was added under high agitation, followed by 83 kg of sucrose. The liquid was then UHT treated for 5 sec at 143° C., homogenized at 180/40 bar, cooled and the coffee whitener was aseptically filled into jars, jugs or pouches.

The product was stored during nine months at room temperature. No creaming, phase separation, gelation, sedimentation and practically no viscosity changes were found during the storage. Mouth-feel of coffee with added coffee whitener was judged by six non-trained panelists, which found the product having good mouth-feel, body, smooth texture, and a good flavor without altered flavor or an "off" taste.

Example 2

A coffee whitener was prepared as in Example 1 but using CMC instead of MCC/CMC cellulose component.

The product was stored during 3 months at room temperature. Significant sediment formation was found in the coffee whitener samples during the storage. Further, when added to coffee, a significant decrease of whitening ability as compared to the fresh made coffee whitener was observed.

Example 3

A coffee whitener was prepared as in Example 1 but using Xanthan gum instead of CMC and MCC.

The product was stored during 3 months at room temperature. Creaming, phase separation/ marbling, and gelation were found in the coffee whitener samples during the storage.

Example 4

A coffee whitener was prepared as in Example 1 but using 3.0 kg of sodium caseinate and 30 kg of oil.

The product was stored during nine months at room temperature. No creaming, phase separation, gelation, sedimentation and practically no viscosity changes were found during the storage. Mouth-feel of coffee with added coffee whitener was judged by six non-trained panelists, which found the product having good mouth-feel, body, smooth texture, and a good flavor without altered flavor or an "off" taste.

It will be appreciated by one of skill in the art that various modifications and variations of the exemplary embodiments disclosed above may be made without departing from the scope of the invention as defined above and with reference to the appended claims.

What is claimed is:

1. A shelf-stable, liquid whitening composition comprising a whitening agent and a stabilizing system, the stabilizing system comprising:
   a gum component in an amount sufficient to suspend the whitening agent both in the liquid whitening composition and in an aqueous media to which the liquid whitening composition is added;
   an emulsifying component in an amount sufficient to maintain emulsion stability of the whitening composition and emulsion stability of the whitening composition in the aqueous media; and
   a cellulose component including a blend of two different cellulose compounds in an amount sufficient to stabilize the liquid whitening composition and to provide stability to the whitening composition in the aqueous media, wherein:
   the stabilizing system maintains the liquid whitening composition in a homogeneous state for at least about 9 months at ambient temperatures,
   the stabilizing system provides for suspension and emulsion of the whitening composition in the aqueous media,
   the cellulose component includes a mixture of microcrystalline cellulose and carboxymethylcellulose at a ratio of microcrystalline cellulose to carboxymethylcellulose of about 9:1 to about 10:1 by weight, and
   the gum component includes a mixture of kappa and iota carrageenan at a ratio of kappa to iota carrageenan of about 1:2 to about 1:6 by weight.

2. The liquid whitening composition according to claim 1, wherein the whitening agent is titanium dioxide.

3. The liquid whitening composition according to claim 2, wherein the titanium dioxide is present in an amount of about 0.05 to about 1 percent by weight of the composition.

4. The liquid whitening composition according to claim 2, wherein the titanium dioxide has a particle size of about 0.1 to about 0.7 microns.

5. The liquid whitening composition according to claim 1, wherein the gum component is present in an amount of about 0.005 to about 0.2 percent by weight of the composition.

6. The liquid whitening composition according to claim 1, wherein the emulsifying component includes sodium caseinate in an amount of about 0.1 to 1.8 percent by weight of the composition and a low molecular weight emulsifier in an amount of about 0.1 to about 1.0 percent by weight of the composition, and wherein the low molecular weight emulsifier is selected from the group consisting of monoglycerides, diglycerides, acid esters of monoglycerides, sodium or calcium stearoyl lactylate, lecithin, enzyme modified lecithin, stearyl citrate, fatty acids, fatty acid salts, diacetyl esters of monoglycerides and mixtures thereof.

7. The liquid whitening composition of claim 6, wherein the low molecular weight emulsifier is a combination of monoglyceride and acid ester of the monoglyceride.

8. The liquid whitening composition of claim 6, wherein the sodium caseinate is present in an amount of about 0.15 to about 0.3 percent by weight of the composition.

9. The liquid whitening composition according to claim 1, wherein the cellulose component is present in an amount of about 0.1 to about 1 percent by weight of the composition.

10. The liquid whitening composition according to claim 1, further comprising a vegetable oil in an amount of about 0.5 to about 15 percent by weight of the composition.

11. The liquid whitening composition according to claim 1, further comprising a sweetener in an amount of about 0.1 to about 50 percent by weight of the composition.

12. The liquid whitening composition according to claim 1, wherein the liquid whitening composition is low-fat or non-fat and includes a pH buffer.

13. The liquid whitening composition according to claim 1, wherein the composition has a total solids content between about 10 to about 65 percent by weight of the composition.

14. The liquid whitening composition according to claim 1, wherein:
the whitening agent is titanium dioxide having a particle size of about 0.1 to about 0.7 microns and is present in an amount of about 0.05 to about 1 percent by weight of the whitening composition;
the gum component is present in an amount of about 0.005 to about 0.2 percent by weight of the whitening composition; the emulsifying component includes sodium caseinate in an amount of about 0.1 to 1.8 percent by weight of the whitening composition, and a low molecular weight emulsifier in an amount of about 0.1 to about 1.0 percent by weight of the whitening composition, wherein the low molecular weight emulsifier is a combination of monoglyceride and acid ester of the monoglyceride; and
the cellulose component is present in an amount of about 0.1 to about 1 percent by weight of the whitening composition.

15. The liquid whitening composition according to claim 1, wherein the gum component and the cellulose component are provided as a co-processed composition comprising said gum component and cellulose component.

16. A beverage comprising water, a beverage-forming component, a sufficient amount of whitening agent, and a stabilizing system, the stabilizing system comprising:
a gum component in an amount sufficient to suspend the whitening agent both in a liquid whitening composition and in the beverage to which the liquid whitening composition is added;
an emulsifying component in an amount sufficient to maintain emulsion stability of the whitening composition and emulsion stability of the whitening composition in the beverage; and
a cellulose component including a blend of two different cellulose compounds in an amount sufficient to stabilize the liquid whitening composition and to provide stability to the whitening composition in the beverage, wherein:
the stabilizing system maintains the liquid whitening composition in a homogeneous state for at least about 9 months at ambient temperatures,
the stabilizing system provides for suspension and emulsion of the whitening composition in the aqueous media to provide whitening to the beverage,
the cellulose component includes a mixture of microcrystalline cellulose and carboxymethylcellulose at a ratio of microcrystalline cellulose to carboxymethylcellulose of about 9:1 to about 10:1 by weight, and
the gum component includes a mixture of kappa and iota carrageenan at a ratio of kappa to iota carrageenan of about 1:2 to about 1:6 by weight.

17. The beverage of claim 16, wherein the beverage forming component is coffee, tea, a chocolate-based drink or a fruit drink.

18. A process of preparing a whitening composition comprising:
providing a whitening agent and stabilizing system components in powdered form;
dissolving the whitening agent and components in hot water under agitation;
adding a melted fat to the hot water to produce a mixture;
sterilizing the mixture using ultra-high temperature (UHT) treatment;
homogenizing the mixture; and
cooling the mixture under aseptic conditions to produce a shelf-stable, liquid whitening composition comprising a whitening agent and a stabilizing system, the stabilizing system comprising: a gum component, an emulsifying component, and a cellulose component including a blend of two different cellulose compounds, wherein:
the stabilizing system maintains the liquid whitening composition in a homogeneous state for at least about 9 months at ambient temperatures,
the stabilizing system provides for suspension and emulsion of the whitening composition in an aqueous media to which the whitening composition is added,
the cellulose component includes a mixture of microcrystalline cellulose and carboxymethylcellulose at a ratio of microcrystalline cellulose to carboxymethylcellulose of about 9:1 to about 10:1 by weight, and
the gum component includes a mixture of kappa and iota carrageenan at a ratio of kappa to iota carrageenan of about 1:2 to about 1:6 by weight.

19. The process of claim 18, wherein homogenization occurs at a time selected from the group consisting of before UHT treatment, after UHT treatment, and before and after UHT treatment.

20. A liquid whitening composition comprising:
titanium dioxide having a particle size of about 0.1 to about 0.7 microns and present in an amount of about 0.05 to about 1 percent by weight of the whitening composition;
a gum component comprising a mixture of kappa and iota carrageenan and present in an amount of about 0.005 to about 0.2 percent by weight of the whitening composition, with the weight to weight ratio of kappa to iota carrageenan being about 1:2 to about 1:6; and
an emulsifying component comprising sodium caseinate in an amount of about 0.1 to 1.8 percent by weight of the whitening composition and a low molecular weight emulsifier in an amount of about 0.1 to about 1.0 percent by weight of the composition, wherein the low molecular weight emulsifier is a combination of monoglyceride and acid ester of the monoglyceride; and
a cellulose component comprising a blend of microcrystalline cellulose and carboxymethylcellulose and present in an amount of about 0.1 to about 1 percent by weight of the composition, wherein a weight ratio of microcrystalline cellulose to carboxymethylcellulose is about 9:1 to about 10:1.

* * * * *